United States Patent
Lin

(10) Patent No.: US 12,286,826 B1
(45) Date of Patent: Apr. 29, 2025

(54) SPIRAL GUIDING DUAL-AXIS HINGE

(71) Applicant: SHIN ZU SHING CO., LTD., New Taipei (TW)

(72) Inventor: Ming Chin Lin, New Taipei (TW)

(73) Assignee: SHIN ZU SHING CO., LTD., New Taipei (TW)

( * ) Notice: Subject to any disclaimer, the term of this patent is extended or adjusted under 35 U.S.C. 154(b) by 85 days.

(21) Appl. No.: 18/381,469

(22) Filed: Oct. 18, 2023

(51) Int. Cl.
| | |
|---|---|
| *E05D 3/06* | (2006.01) |
| *E05D 5/04* | (2006.01) |
| *E05D 7/00* | (2006.01) |
| *E05D 11/00* | (2006.01) |
| *E05D 7/04* | (2006.01) |

(52) U.S. Cl.
CPC ............ *E05D 7/0027* (2013.01); *E05D 5/04* (2013.01); *E05D 11/0054* (2013.01); *E05D 2007/0484* (2013.01)

(58) Field of Classification Search
CPC ...... G06F 1/168; G06F 1/1681; G06F 1/1616; G06F 1/547; E05Y 2900/602; E05Y 2900/606; E05Y 2800/205; E05Y 2800/20; E05Y 2800/242; E05Y 2201/218; E05Y 2201/232; H04M 1/022; H04M 1/0214; H04M 1/0216; H05D 5/0226; E05D 3/12; E05D 3/122; E05D 3/14; E05D 3/16; E05D 3/06; E05D 11/0054; E05D 11/06; E05D 11/087; E05D 11/105; E05D 1/00; E05D 1/02; E05D 1/04; E05D 5/04; E05D 7/00; E05D 7/0027; E05D 2007/0484; F16C 11/04; F16C 11/12

See application file for complete search history.

(56) References Cited

U.S. PATENT DOCUMENTS

| | | | | |
|---|---|---|---|---|
| 11,243,578 | B2* | 2/2022 | Torres | G06F 1/1616 |
| 11,408,214 | B1* | 8/2022 | Hsu | H04M 1/022 |
| 2015/0245510 | A1* | 8/2015 | Hsu | E05D 3/12 16/250 |
| 2018/0329462 | A1* | 11/2018 | Larsen | G06F 1/1681 |
| 2023/0076291 | A1* | 3/2023 | Yun | F16C 11/04 |
| 2024/0053802 | A1* | 2/2024 | Kim | G06F 1/1652 |
| 2024/0402758 | A1* | 12/2024 | Liu | G06F 1/1656 |
| 2024/0406296 | A1* | 12/2024 | Feng | G06F 1/1681 |

* cited by examiner

*Primary Examiner* — Chuck Y Mah
(74) *Attorney, Agent, or Firm* — Birch, Stewart, Kolasch & Birch, LLP

(57) ABSTRACT

A spiral guiding dual-axis hinge has a fixing base, two mounting brackets, a slider, and a cover. The fixing base includes two installation recesses and a guiding track. The guiding track is located between the two installation recesses; each of the two mounting brackets has an installing part and a mounting part, a top surface of the installing part forms a spiral groove extending obliquely, the two mounting brackets are movably mounted in the two installation recesses. The slider has two wing parts and a guiding part, a guiding pole is formed on the guiding part, and the slider is mounted in the two spiral grooves via the two wing parts; the guiding pole is disposed through the guiding track. The cover covers the fixing base. The two mounting brackets are linked by the slider, thereby flipping movements of the two mounting brackets being synchronized.

12 Claims, 9 Drawing Sheets

SPIRAL GUIDING DUAL-AXIS HINGE

BACKGROUND OF THE INVENTION

1. Field of the Invention

The present invention relates to a spiral guiding dual-axis hinge, especially to a spiral guiding dual-axis hinge that is capable of synchronizing motions of two mounting brackets.

2. Description of the Prior Arts

In order to have a much larger screen and a much smaller volume simultaneously on an electronic mobile device, especially a mobile phone, a foldable phone is developed, and such foldable phone has a foldable screen that is capable of being flipped to fold or unfold. A key element of the foldable phone is a hinge, and how to select a proper hinge to be installed into a limited space is what the developers are endeavoring on.

However, the hinge of a conventional foldable phone has disadvantages such as heavy weight, large space occupation, and loosening connection among components, all of which are caused by the hinge being composed of too many components. The aforementioned disadvantages also lead to tolerance accumulation which may cause movements of two sides of the foldable screen unsynchronized or dragged during flipping.

To overcome the shortcomings, the present invention provides a spiral guiding dual-axis hinge to mitigate or obviate the aforementioned problems.

SUMMARY OF THE INVENTION

The main objective of the present invention is to provide a spiral guiding dual-axis hinge that has two mounting brackets which have synchronized flipping movements in cooperation with a slider.

The spiral guiding dual-axis hinge has a fixing base, two mounting brackets, a slider, and a cover. The fixing base has two installation recesses and a guiding track; a bottom part of each one of the two installation recesses is curved; each one of the two installation recesses has an axial direction and a radial direction; the guiding track is located between the two installation recesses and the guiding track extends along the axial direction. The two mounting brackets are symmetric to each other, and each one of the two mounting brackets includes a mounting part and an installing part connected to each other; the installing part has a top surface and a bottom surface; a spiral groove is recessed from the top surface and the spiral groove obliquely extends along the radial direction; the mounting bracket is movably mounted in a corresponding one of the two installation recesses via the bottom surface. The slider has two wing parts and a guiding part; each one of the two wing parts is mounted in the spiral groove of a corresponding one of the two mounting brackets; the guiding part is located between the two wing parts, and a guiding pole protrudes from the guiding part; the guiding pole is disposed through the guiding track. The cover covers the fixing base. Wherein, when the two mounting brackets pivot, the slider is capable of sliding along the guiding track.

An advantage of the spiral guiding dual-axis hinge is, with the two mounting brackets linked up via the slider, the movements of the two mounting brackets during flipping are synchronized. In addition, the guiding track limits a moving range of the slider to further limit a range of a flipping angle of each one of the two mounting brackets. The spiral guiding dual-axis hinge has advantages of smaller size, lighter weight, and less components to reduce tolerance accumulation, and thereby when the spiral guiding dual-axis hinge is applied to a foldable phone, an unsynchronized flipping of two sides of a foldable screen would be avoided, and a beneficial effect of smooth flipping is further achieved. The rib of each one of the two wing parts is capable of increasing a structural rigidity and guiding the slider to move stably in cooperation with the guiding grooves of the cover.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
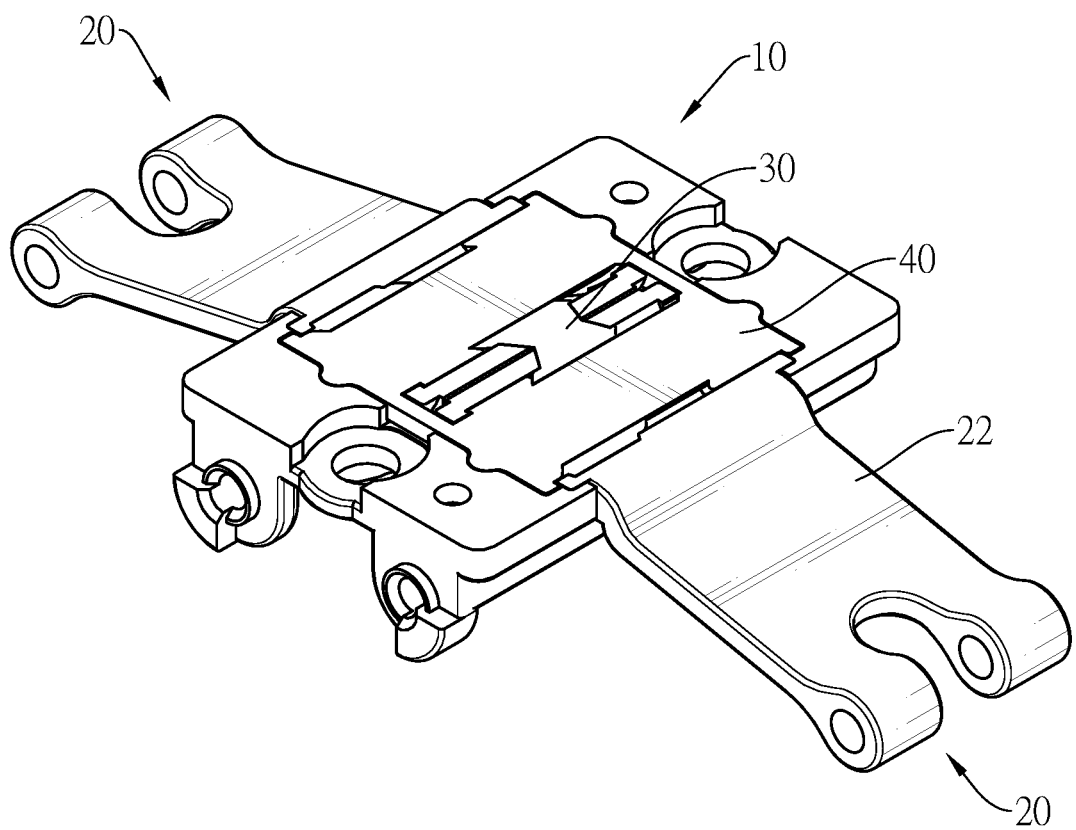
FIG. 1 is a perspective view of a spiral guiding dual-axis hinge in accordance with the present invention.

With reference to FIG. 1, a spiral guiding dual-axis hinge in accordance with the present invention comprises a fixing base 10, two mounting brackets 20, a slider 30, and a cover 40.

Figure 2:
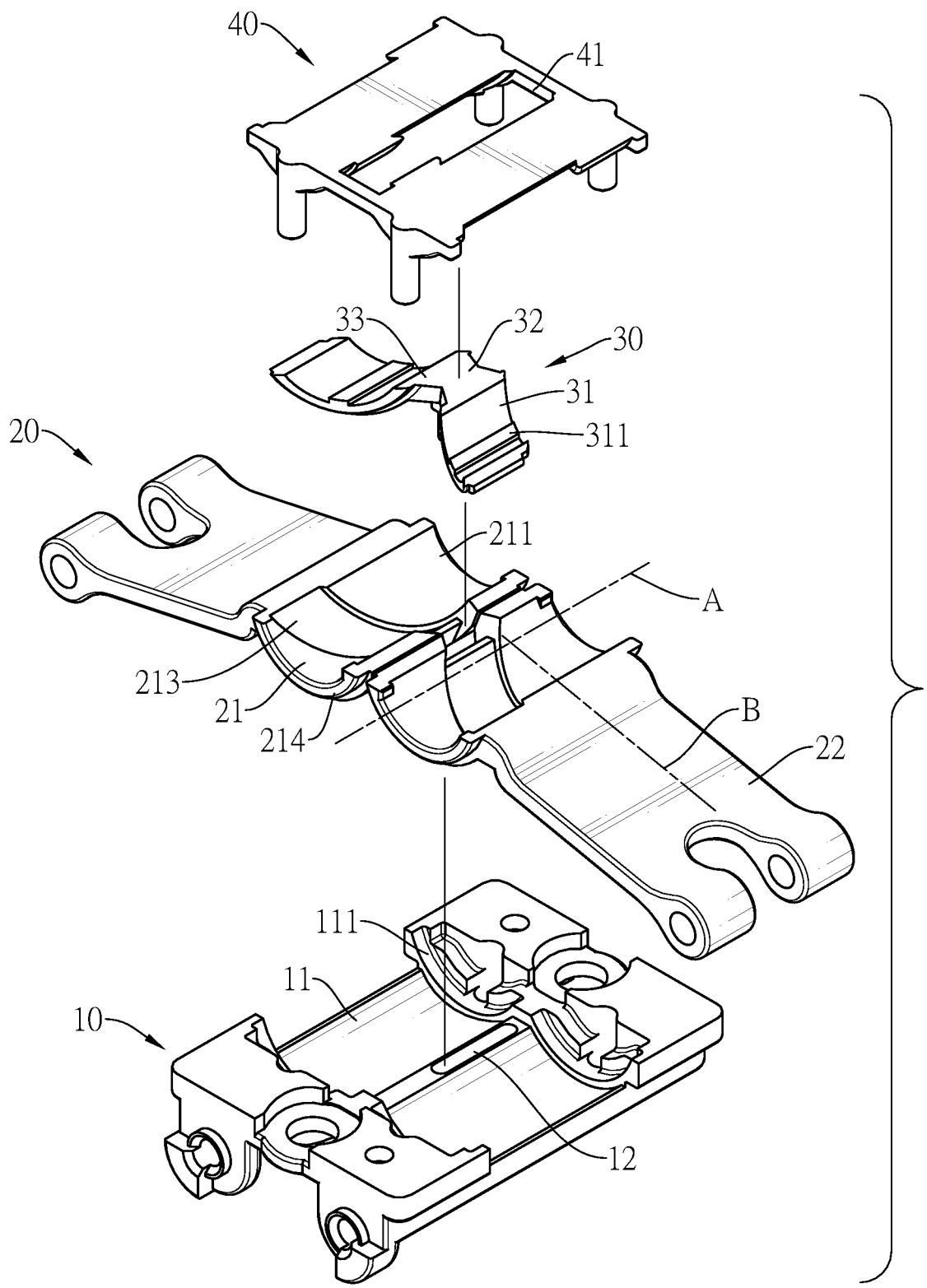
FIG. 2 is an exploded view of the spiral guiding dual-axis hinge in FIG. 1.
Figure 3:
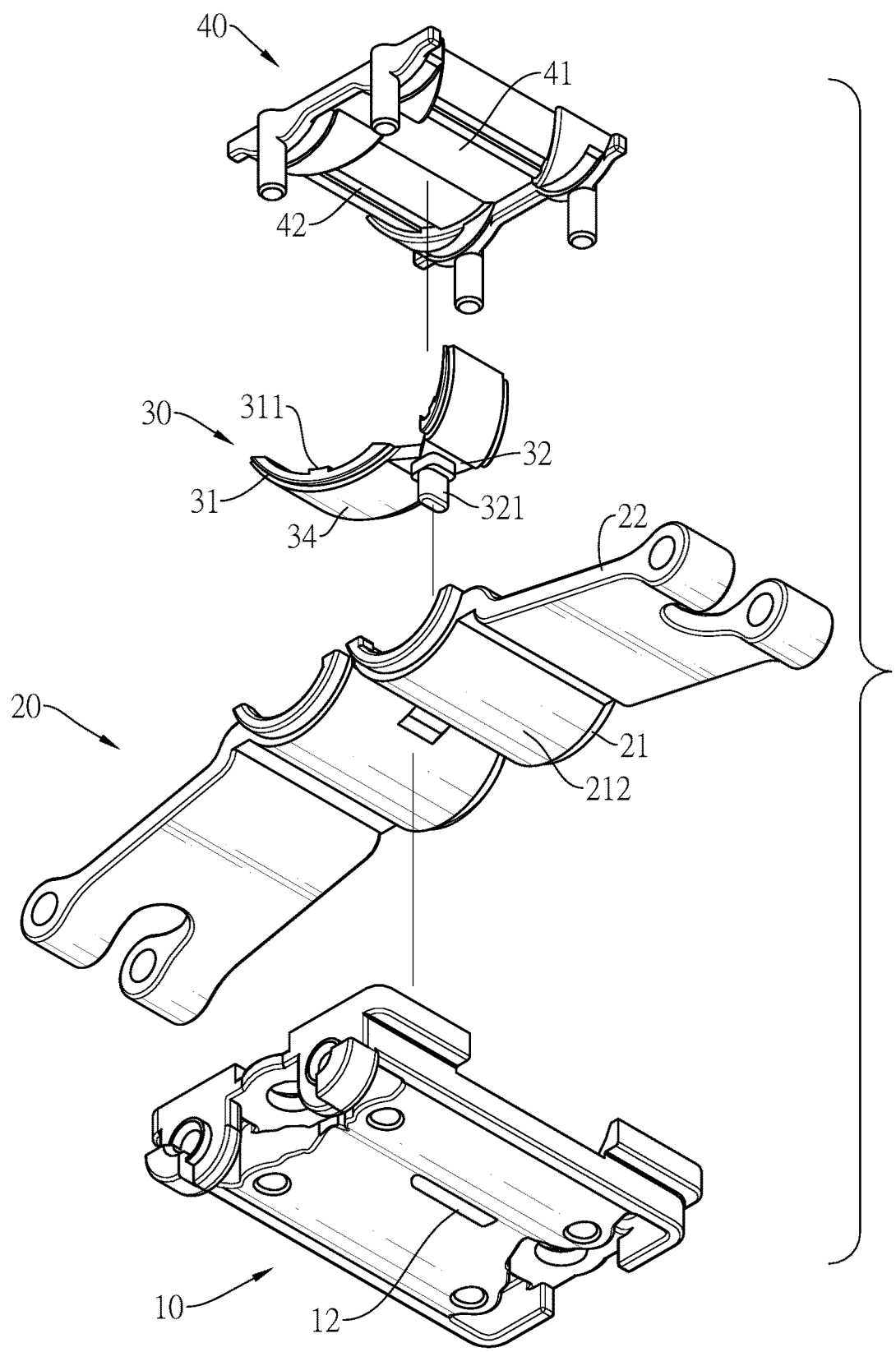
FIG. 3 is another exploded view of the spiral guiding dual-axis hinge in FIG. 1, shown in another view angle.

With reference to FIGS. 2 and 3, the fixing base 10 is a symmetrically shaped plate, and the fixing base 10 includes two installation recesses 11 and a guiding track 12, a bottom part of each one of the two installation recesses 11 is curved, and each one of the two installation recesses 11 has an axial direction A and a radial direction B. The axial direction A and the radial direction B are perpendicular to each other. Each one of the two installation recesses 11 has two opposite ends in the axial direction A, and a supporting part 111 is formed on each one of the two opposite ends. The supporting part 111 protrudes from the bottom part of a corresponding one of the two installation recesses 11, and the supporting part 111 is curved along the bottom part of the installation recess 11, but it is not limited thereto, as the installation recesses 11 may not have the supporting part 111. The guiding track 12 is located between the two installation recesses 11, and the guiding track 12 extends along the axial direction A; in this embodiment, the guiding track 12 is an elongated hole and penetrates the fixing base 10, but it is not limited thereto.

Figure 4:
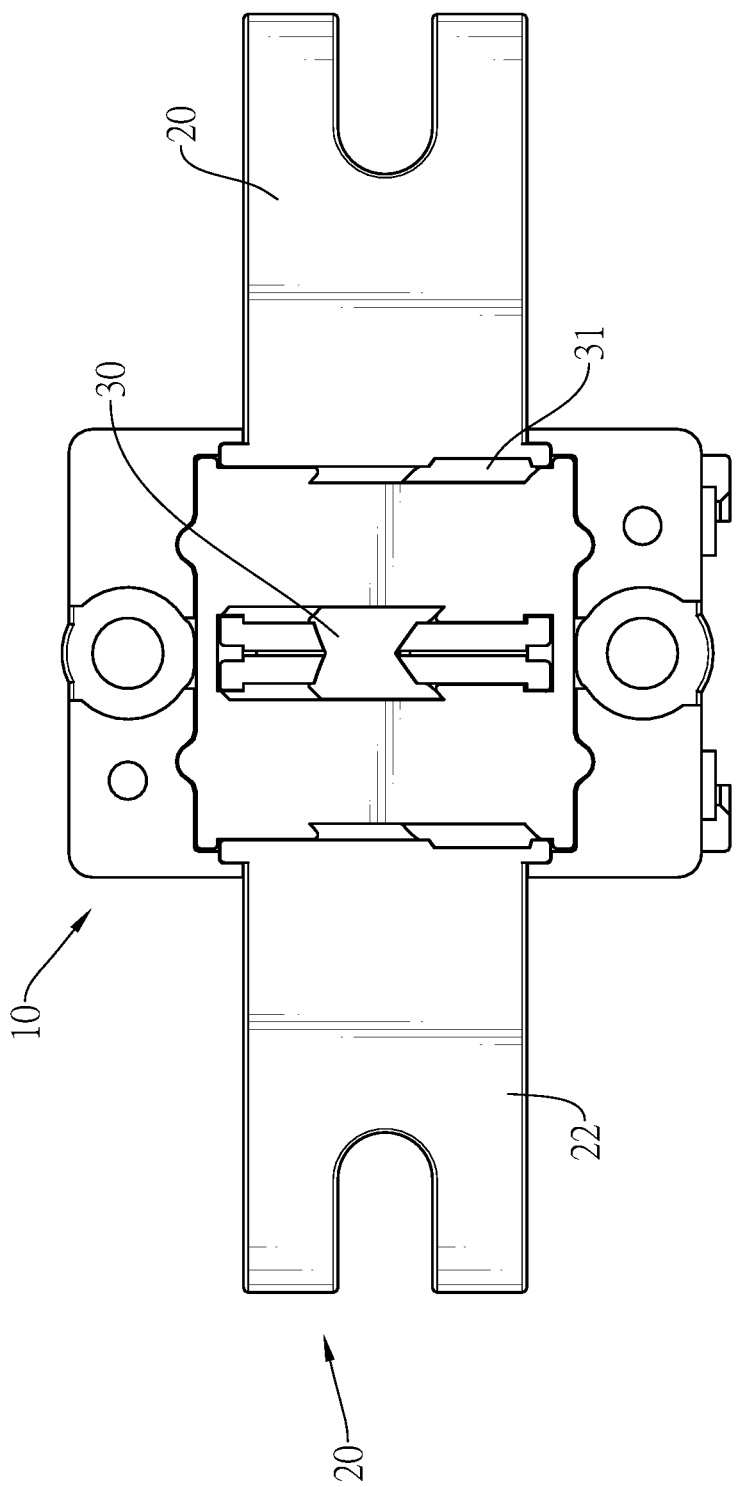
FIG. 4 is a top view of the spiral guiding dual-axis hinge in FIG. 1, shown the two mounting brackets expanding in 180 degrees.

With reference to FIGS. 2 to 4, as the two mounting brackets 20 are symmetric to each other, only one of the two mounting brackets 20 is taken as an example for explanation. Each one of the two mounting brackets 20 includes an installing part 21 and a mounting part 22, and the installing part 21 and the mounting part 22 are connected to each other; the installing part 21 is a curved plate, and the installing part 21 has a top surface 211 and a bottom surface 212. The top surface 211 and the bottom surface 212 are two opposite surfaces located up and down at the installing part 21. Besides, the installing part 21 is curved along the bottom part of the corresponding installation recess 11. A spiral groove 213 is formed on the top surface 211. The spiral groove 213 is recessed from the top surface 211, and the spiral groove 213 obliquely extends along the radial direction B. In this embodiment, the spiral groove 213 is curved along the installing part 21, and the spiral groove 213 obliquely extends from an edge of the installing part 21, and an angle between said edge and the spiral groove 213 is 45 degrees, but it is not limited thereto, said angle may be altered according to user demands.

The installing part 21 of each one of the two mounting brackets 20 has two end surfaces in the axial direction A, and an adhesion part 214 protrudes from each one of the two end surfaces. The adhesion part 214 is curved and a shape of the adhesion part 214 fits a corresponding one of the supporting parts 111. The mounting part 22 is configured to mount a screen of an electronic device (not shown in the figures). Each one of the two mounting brackets 20 is movably mounted in the corresponding installation recess 11 of the fixing base 10 via the bottom surface 212. Each one of the two adhesion parts 214 is attached to the corresponding supporting part 111 and is slidable with respect to the supporting part 111, but it is not limited thereto; in another embodiment, the installing part 21 may not have the adhesion part 214.

The slider 30 has two wing parts 31 and a guiding part 32, the guiding part 32 is located between the two wing parts 31, and a shape of the slider 30 fits a shape of the spiral groove 213. The slider 30 has an upper surface 33 and a lower surface 34, which are two opposite surfaces located up and down at the slider 30. Each one of the two wing parts 31 has a rib 311, the rib 311 protrudes from the upper surface 33 and extends along the axial direction A, but it is not limited thereto; a configuration of the rib 311 may be altered according to user demands, and in another embodiment, the wing parts 31 may not have the ribs 311. A guiding pole 321 protrudes from the guiding part 32, and the guiding pole 321 is located at the lower surface 34. Each one of the two wing parts 31 of the slider 30 is mounted in the spiral groove 213 of a corresponding one of the two mounting brackets 20, and the guiding pole 321 is disposed through the guiding track 12.

The cover 40 has a penetrating hole 41 and multiple guiding grooves 42, and the penetrating hole 41 penetrates the cover 40 and extends along the axial direction A. Each one of the two guiding grooves 42 is recessed from a lateral surface of the cover 40, and the guiding groove 42 extends along the axial direction A; a position of each one of the two guiding grooves 42 corresponds to a position the rib 311 of a corresponding one of the two wing parts 31. The lateral surface of the cover 40 that forms the two guiding grooves 42 covers the fixing base 10, and the guiding part 32 of the slider 30 is disposed through the penetrating hole 41; the rib 311 of each one of the two wing parts 31 is movably mounted in a corresponding one of the two guiding grooves 42, but it is not limited thereto; in another embodiment, the cover 40 may not have the penetrating hole 41 and the guiding grooves 42.

Figure 5:
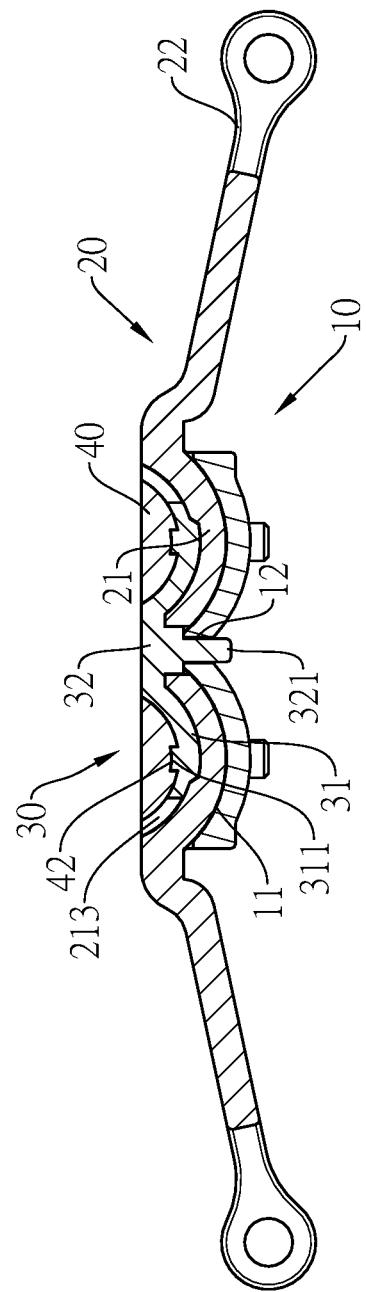
FIG. 5 is a cross-sectional view of the spiral guiding dual-axis hinge in FIG. 1, showing the two mounting brackets expanding in 180 degrees.
Figure 6:
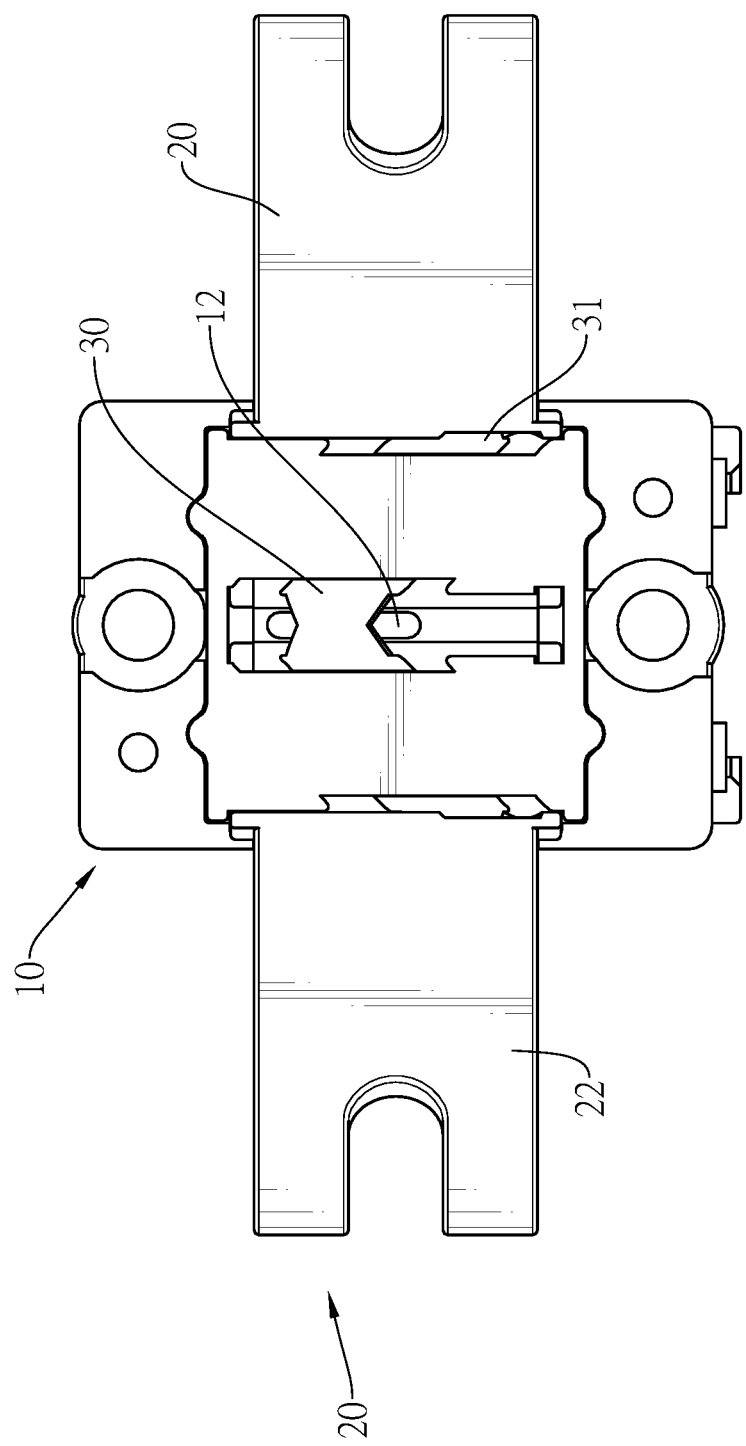
FIG. 6 is a top view of the spiral guiding dual-axis hinge in FIG. 1, showing the two mounting brackets expanding in 90 degrees.
Figure 7:
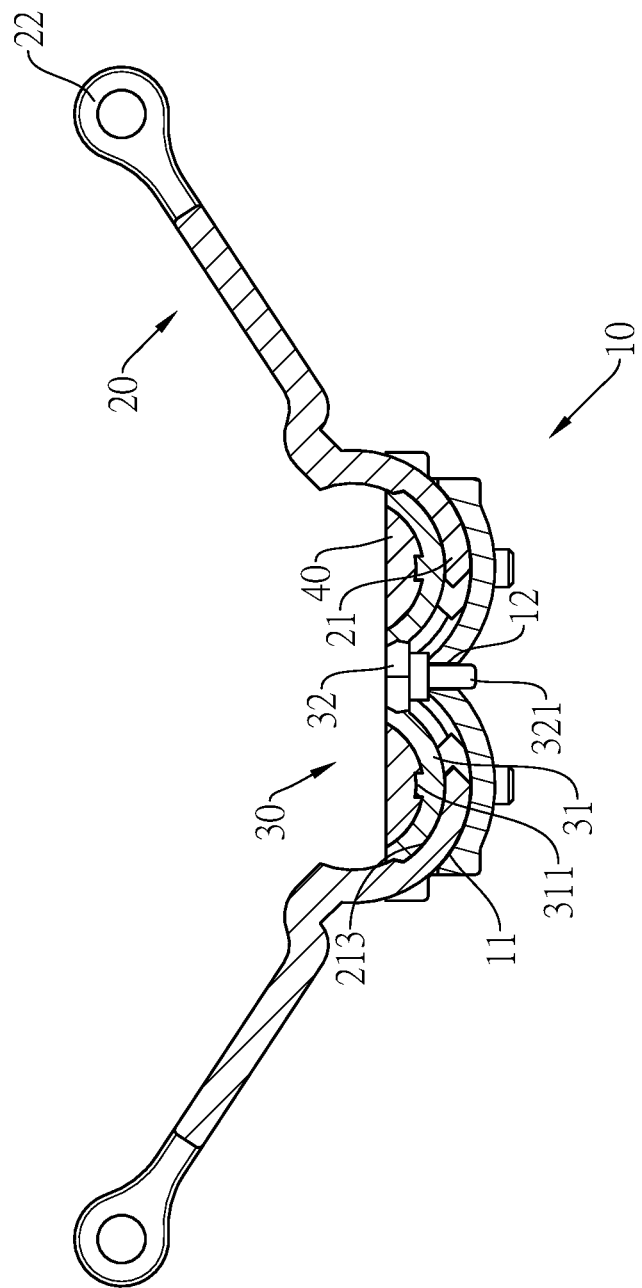
FIG. 7 is a cross-sectional view of the spiral guiding dual-axis hinge in FIG. 1, showing the two mounting brackets expanding in 90 degrees.
Figure 8:
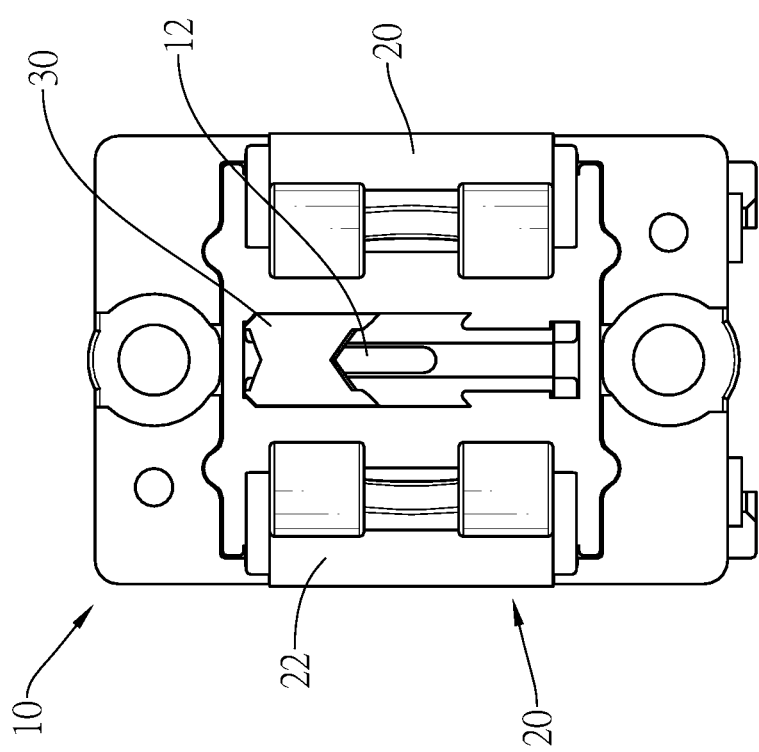
FIG. 8 is a top view of the spiral guiding dual-axis hinge in FIG. 1, showing the two mounting brackets folded.
Figure 9:
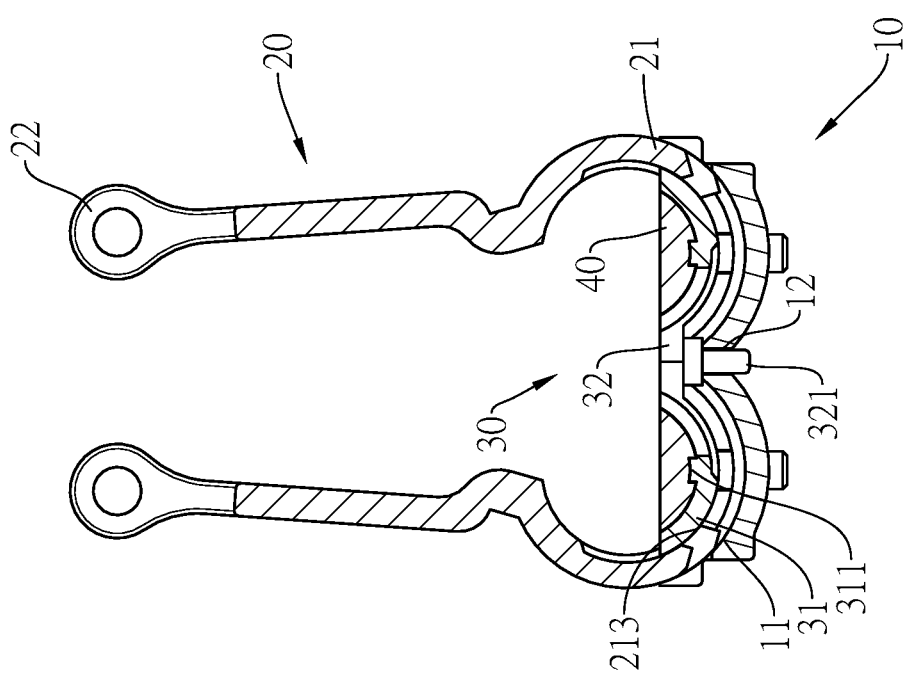
FIG. 9 is a cross-sectional view of the spiral guiding dual-axis hinge in FIG. 1, showing the two mounting brackets folded.

To explain a process of flipping to fold the spiral guiding dual-axis hinge, the spiral guiding dual-axis hinge is supposed to be mounted on an imaginary electronic device which is not shown in the figures; as shown in FIGS. 3 to 5, an angle between the two mounting brackets 20 is expanded to about 180 degrees, and the guiding part 32 of the slider 30 is at a starting position, which means that the guiding pole 321 contacts an inner lateral wall of an end of the guiding track 12; then as shown in FIGS. 6 and 7, the angle between the two mounting brackets 20 is 90 degrees, during the process of flipping, the two wing parts 31 of the slider 30 are pressed by the spiral grooves 213 of the two mounting brackets 20, such that slider 30 moves along the guiding track 12 and to another end of the guiding track 12; then as shown in FIGS. 8 and 9, the angle between the two mounting brackets 20 is approximately 0 degree, i.e., the two mounting brackets are approximately parallel to each other and presenting a closing state, whilst the guiding part 32 of the slider 30 is at an ending position, which means that the guiding pole 321 contacts an inner lateral wall of said another end of the guiding track 12.

In the aforementioned process, the two mounting brackets 20 are linked by the slider 30, and thereby movements of the two mounting brackets 20 during flipping are synchronized; besides, the guiding track 12 limits a moving range of the slider 30 to further limit a range of a flipping angle of each one of the two mounting brackets 20. Compared to the prior art, the spiral guiding dual-axis hinge has advantages of smaller size, lighter weight, and less components, further reducing tolerance accumulation. Therefore, when the spiral guiding dual-axis hinge is applied to a foldable phone, an unsynchronized flipping of two sides of a foldable screen would be avoided, and a beneficial effect of smooth flipping is further achieved.

In the aforementioned process, aside of increasing a structural rigidity, the rib 311 of each one of the two wing parts 31 is also capable of guiding the slider 30 to move stably in cooperation with the guiding grooves 42 of the cover 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A spiral guiding dual-axis hinge comprising:
   a fixing base having:
      two installation recesses, and a bottom part of each one of the two installation recesses being curved; each one of the two installation recesses having an axial direction and a radial direction; and
      a guiding track located between the two installation recesses and the guiding track extending along the axial direction;
   two mounting brackets being symmetric to each other, and each one of the two mounting brackets including:
      a mounting part and an installing part connected to each other; the installing part having:

a top surface, and a spiral groove recessed from the top surface and the spiral groove obliquely extending along the radial direction; and a bottom surface, and the mounting bracket movably mounted in a corresponding one of the two installation recesses via the bottom surface;

a slider having:

two wing parts, and each one of the two wing parts mounted in the spiral groove of a corresponding one of the two mounting brackets; and a guiding part located between the two wing parts, and a guiding pole protruding from the guiding part; the guiding pole disposed through the guiding track;

a cover covering the fixing base;

wherein, when the two mounting brackets pivot, the slider is capable of sliding along the guiding track.

2. The spiral guiding dual-axis hinge as claimed in claim 1, wherein:

each one of the two installation recesses has two opposite ends in the axial direction, and a supporting part is formed on each one of the two opposite ends; the supporting part protrudes from the bottom part of the corresponding installation recess, and the supporting part is curved; and the installing part of each one of the two mounting brackets has two end surfaces in the axial direction, and an adhesion part protrudes from each one of the two end surfaces; the adhesion part is attached to the supporting part of the corresponding installation recess, and the adhesion part is capable of sliding with respect to the supporting part.

3. The spiral guiding dual-axis hinge as claimed in claim 1, wherein, the slider has:

an upper surface and a lower surface, and the upper surface of each one of the two wing parts of the slider forming a rib; the rib protruding from the upper surface and extending along the axial direction.

4. The spiral guiding dual-axis hinge as claimed in claim 2, wherein, the slider has:

an upper surface and a lower surface, and the upper surface of each one of the two wing parts of the slider forming a rib; the rib protruding from the upper surface and extending along the axial direction.

5. The spiral guiding dual-axis hinge as claimed in claim 3, wherein the cover further has:

multiple guiding grooves, each one of the guiding grooves recessed from a lateral surface of the cover, and said lateral surface covering the fixing base, and each one of the guiding grooves extending along the axial direction; the rib of each one of the two wing parts movably mounted in a corresponding one of the guiding grooves.

6. The spiral guiding dual-axis hinge as claimed in claim 4, wherein the cover further has:

multiple guiding grooves, each one of the guiding grooves recessed from a lateral surface of the cover, and said lateral surface covering the fixing base, and each one of the guiding grooves extending along the axial direction; the rib of each one of the two wing parts movably mounted in a corresponding one of the guiding grooves.

7. The spiral guiding dual-axis hinge as claimed in claim 5, wherein the guiding track is an elongated hole and the guiding track penetrates the fixing base; the guiding pole is capable of moving along the guiding track.

8. The spiral guiding dual-axis hinge as claimed in claim 6, wherein the guiding track is an elongated hole and the guiding track penetrates the fixing base; the guiding pole is capable of moving along the guiding track.

9. The spiral guiding dual-axis hinge as claimed in claim 7, wherein:

the cover forms a penetrating hole, and the penetrating hole extends along the axial direction; the guiding part of the slider is mounted in the penetrating hole.

10. The spiral guiding dual-axis hinge as claimed in claim 8, wherein:

the cover forms a penetrating hole, and the penetrating hole extends along the axial direction; the guiding part of the slider is mounted in the penetrating hole.

11. The spiral guiding dual-axis hinge as claimed in claim 9, wherein:

the installing part of each one of the two mounting brackets is curved along the bottom part of the corresponding installation recess, and thereby the spiral groove is curved along the installing part; the spiral groove obliquely extends from an edge of the installing part, and an angle between said edge and the spiral groove is 45 degrees.

12. The spiral guiding dual-axis hinge as claimed in claim 10, wherein:

the installing part of each one of the two mounting brackets is curved along the bottom part of the corresponding installation recess, and thereby the spiral groove is curved along the installing part; the spiral groove obliquely extends from an edge of the installing part, and an angle between said edge and the spiral groove is 45 degrees.

* * * * *